United States Patent Office 3,165,479
Patented Jan. 12, 1965

3,165,479
PROCESS FOR ACTIVATING A CATALYST
COMPOSITE
Emmett H. Burk, Jr., Hazel Crest, and John Mooi, Homewood, Ill., assignors, by mesne assignments, to Engelhard Industries, Inc., Newark, N.J., a corporation of Delaware
No Drawing. Filed Aug. 7, 1959, Ser. No. 832,132
6 Claims. (Cl. 252—442)

This invention relates to a process for activating a catalyst of the type described in the copending application of Keith and Burk Serial No. 683,931, filed September 16, 1957, and now abandoned, which includes a supporting material, a noble metal, and an aluminum halide Friedel-Crafts component. More particularly, the present invention is concerned with a process for treating the catalyst wherein the noble metal is present as a decomposable noble metal compound, e.g., noble metal oxide, under vacuum to provide, in addition to free noble, e.g., platinum, metal, better halide retention on the supporting material and increased selectivity. These catalysts have particular utility in the hydrocarbon conversion field and especially in a process directed to the isomerization of $C_4$ to $C_9$ n-paraffinic-containing hydrocarbon materials at relatively low temperatures while obtaining satisfactory conversion to isomer structures.

It has been found that the activity of a noble metal-aluminum halide-alumina catalyst of the type described above can be significantly increased when treated according to the process of the present invention, which includes placing the catalyst under a vacuum sufficient to allow the decomposable noble metal compound to decompose, when further heated, to provide free noble metal. The vacuum is effected at relatively low temperatures to keep the aluminum halide Friedel-Crafts component on the supporting material; these temperatures will generally be up to about 150° F. and preferably from about ambient temperatures up to about 100° F. The vacuum is generally decreased to less than about 5 mm. Hg and preferably less than about 0.5 mm. Hg. The noble metal decomposable compound-aluminum halide-alumina catalyst in the vacuum is activated by heating at temperatures generally from about 600 to 900° F. and preferably from about 650 to 750° F. for a time sufficient to activate the noble metal component, e.g., to produce free noble metal, from a noble metal compound, for instance noble metal oxide. The activation procedure is conveniently continued for a time sufficient to enhance the isomerization conversion activity of the catalyst, e.g., until the isomerization conversion activity of the catalyst is generally at least about 60 weight percent, preferably at least about 70 weight percent, for pentane. This will generally take from about 0.25 to 48 hours and usually about 4 to 38 hours depending upon the temperatures employed. The heating period should be relatively short to avoid loss of aluminum halide through volatilization or the crumbling of a catalyst as a result of low crush strength or deterioration of the alumina structure.

As described in the above copending application, the catalyst includes catalytically effective amounts of a noble metal, an aluminum halide Friedel-Crafts component and, at least ultimately in the isomerization system, a hydrogen halide, all of which are supported on an alumina base. The noble metal, before activation, can be present as noble metal oxide. The base is usually the major component of the catalyst, constituting about 40 to 95 weight percent, preferably at least about 50 percent. The catalyst base is an activated or gamma-alumina such as those derived by calcination of amorphous hydrous alumina, alumina monohydrate, alumina trihydrate or their mixtures. The catalyst base precursor most advantageously is a mixture predominating in, or containing a major proportion of, for instance, about 65 to 95 weight percent, one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The catalyst employed in the process of the present invention generally contains a Group VIII noble metal decomposable compound sufficient to provide about 0.01 to 2 weight percent, preferably about 0.1 to 0.75 weight percent, of one or more of the platinum metals of Group VIII, that is platinum, palladium, rhodium, ruthenium, osmium or iridium. However, the small amount of noble metal decomposable compound in catalysts of this type may be present in the form of an inorganic compound, e.g., inorganic salt, e.g., a sulfate, chloride, or a chalkogen with an atomic number between 7 and 30, e.g., sulfide, oxide (when the catalyst is calcined in air) or other combined form. The noble metal decomposable compound is decomposed by the process of the present invention to advantageously provide free noble metal. The free metal may interact with other constituents of the catalyst, but if during use the noble metal be present in metallic form then it is preferred that it be so finely divided that it is not detectable by X-ray diffraction means, i.e., that it exists as crystals of less than 50 Angstrom units size. Of the noble metals, platinum is preferred.

The aluminum halide Friedel-Crafts component usually is about 5 to 50 weight percent, preferably about 10 to 30 weight percent, of the catalyst and this component can be, for instance, $AlCl_3$, $AlBr_3$ and similar metal halides where one or more of the anions are replaced with another anion such as hydroxide. Mixtures of these Friedel-Crafts components can also be used; aluminum chloride is, however, the preferred Friedel-Crafts component.

Another component of the catalyst may be a hydrogen halide and the catalyst may advantageously contain about 0.5 to 15 percent or more of a hydrogen halide. The hydrogen halides include, for instance, hydrogen chloride, hydrogen bromide, and their mixtures and preferably the amount of this component on the alumina base is less than about 10 percent of the catalyst. Although the components of the catalyst can vary; as illustrated above, the preferred catalyst employed in the process of our invention contains platinum and aluminum chloride deposited on activated alumina.

The preferred base or supporting material is an activated or gamma-alumina made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous hydrous or monohydrate alumina. Trihydrates are present as well-defined crystallites, that is they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in this patent the calcined catalysts can be characterized by large surface area ranging from about 350 to about 500 or more square meters per gram when in the virgin state as determined, for example, by the BET adsorption technique. A low area catalyst prepared by treating the predominantly trihydrate base precursor is described in U.S. Patent No. 2,838,445. This base when in the virgin state has substantially no pores of radius less than 10 Angstrom units and the surface area of the catalyst is less than 350 square meters/gram and most advantageous is in the range of about 150 to 300 square meters/gram.

The catalyst can be advantageously prepared in accordance with a process described in copending application Serial No. 712,315, filed January 31, 1958, and now abandoned. According to this process, the aluminum halide Friedel-Crafts catalyst is added to a noble metal-gamma alumina composition. The noble metal-gamma alumina composition can be prepared by known procedures. For instance, the platinum metal component can be deposited on a calcined or activated alumina, but it is preferred to add the platinum metal component to the alumina hydrate base precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. The addition of the Friedel-Crafts component to the high area catalyst bases of U.S. Patent No. 2,838,444 has been found to decrease the surface area, for instance, directionally related to the amount of Friedel-Crafts component added. Use of the catalyst in the isomerization system or hydrogen pretreatment increases the area apparently through loss of some of the Friedel-Crafts componen.

The aluminum halide Friedel-Crafts component can be added to the noble metal-alumina composition in vapor form in a flowing gas such as nitrogen, for example; however, we prefer to add the aluminum halide Friedel-Crafts component in vapor form to the platinum-alumina composition by placing the Friedel-Crafts component and the noble metal-alumina composition in a common vessel provided with some means for agitating the mixture of materials, applying heat and agitating the mixture to produce the catalyst.

A hydrogen halide component can be added to the noble metal-alumina-aluminum halide composite by supplying the hydrogen halide as such or by employing an organo-halogen compound or other substance which will produce the hydrogen halide. The hydrogen halide can be added to the composite by contacting the composite directly with hydrogen halide. When using the catalyst in a conversion process, however, such as the isomerization of $C_4$ to $C_9$ n-paraffinic-containing hydrocarbon materials, the hydrogen halide can be added to the noble metal-aluminum halide-alumina composite after it is placed in the isomerization reactor. Conveniently, this is done by including in the n-paraffin feed about 0.05 to 35 weight percent, advantageously about 0.5 to 5 weight percent of the hydrogen halide or of a hydrogen halide-producing material. The addition of the hydrogen halide in these concentrations based on the n-paraffin, is continued over the processing period in order to maintain an adequate concentration of this component on the alumina base and insure the stability of the catalyst against undue aging. The hydrogen halide can be added separately to the reaction system, in the hydrogen-containing recycle gases or in the n-paraffin feed stock. Also, as pointed out above, the hydrogen halide on the alumina base might be added to the catalyst before charging it to the reactor.

When using an organo-halogen compound or other substance as the hydrogen halide supplier, they can also be employed to conveniently supply the hydrogen halide to the catalyst composite under conditions to which the catalyst may be subjected. Suitable hydrogen halide precursors include the elemental halogens, chlorine, bromine and fluorine; mono- and polyhalo-alkanes such as carbon tetrachloride, chloroform and tertiary butyl chloride; or other available materials which will be converted under the conditions of the process in which the catalyst is used, for instance when under isomerization of free hydrogen and temperatures of about 150 to 450° F., to obtain the hydrogen halide.

The noble metal-aluminum halide-alumina catalyst is particularly suitable for use in an isomerization process permitting the use of relatively low reaction temperatures for the isomerization of n-paraffinic hydrocarbons to obtain good yields of branched chain aliphatic structures as described in the above-mentioned application of Keith and Burke Serial No. 683,931, filed September 16, 1957. The branched chain aliphatic structures are highly useful as a component for improving the octane rating of gasoline.

This isomerization process includes contacting $C_4$ to $C_9$ n-paraffinc hydrocarbon material, for instance, in vapor form, with a platinum-aluminum halide-alumina catalyst at temperatures of about 150 to 450° F. in the presence of free hydrogen and while providing hydrogen halide preferably in the n-paraffinic hydrocarbon feed. The hydrogen halide may be provided by a precursor such as carbon tetrachloride under the reaction conditions.

Free or molecular hydrogen must be present in the isomerization reaction system and the hydrogen to n-paraffin molar ratio will usually be from about 0.01 to 15:1 or more, preferably about 1 to 10:1. When processing n-butane the lower concentrations of hydrogen, e.g., less than a one to one molar ratio of hydrogen to n-butane, may be usable with advantage. Conveniently, the hydrogen concentration is maintained by recycling hydrogen-rich gases from the reaction zone. These gases contain hydrogen halide at least after the initial processing period and as there is usually no substantial consumption of the halide after this period the desired concentration in the feed can be maintained merely by recycling the hydrogen-containing gases, for instance, the hydrogen halide concentration can with advantage be about 0.5 to 35 volume percent of the recycled gases.

The present invention is further illustrated with the following specific examples.

EXAMPLE I (A)

A platinum-alumina composition of the kind described in U.S. Patent No. 2,838,444, can be employed in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. The washed hydrate is covered with water in a container and aged at about 90° F. until it is approximately 70% trihydrate, the remaining being substantially of the amorphous or monohydrate forms. The total hydrate composition is comprised of about 42% bayerite, 18% randomite, 11% gibbsite, 20% boehmite, and 9% amorphous as determined by X-ray diffraction analysis. The aged hydrate is mixed with deionized water in a rubber-lined container to provide a slurry of about 7 weight percent $Al_2O_3$ at a pH of about 8.0. A chloroplatinic acid solution in deionized water (0.102 grams platinum per/milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-red Moisture Meter containing a 125 watt bulb, Cat. No. 26675. The resulting mixture is forced through a die plate having holes $1/16''$ in diameter bolted to a $3\frac{1}{2}''$ Welding Engineers screw extruder. The resulting strands are broken to particles of length varying generally between about $1/16''$ to $1''$.

The particles are dried at 230° F. and calcined by heating to 925° F. in a flow of nitrogen gas followed by a flow of air while the catalyst is maintained at a temperature in the range of 865 to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from about 350 to 550 square meters/gram.

(B)

A platinum-alumina composition prepared essentially as described above, except that air was used for the complete calcination procedure and containing about 0.6% platinum was employed in preparing a noble metal-aluminum halide-alumina catalyst by the following procedure. A one-liter, three-necked flask was fitted with a heating mantle, thermometer and an air inlet line having a drying tower filled with Drierite. The flask was fastened to a Syntron Paper Jogger which provided agitation of the catalyst during the impregnation. The flask was swept out with dry air for about 10 minutes. 150 grams of the platinum-alumina catalyst and 45 grams of aluminum chloride were charged to the flask. The air was turned off, the flask was stoppered and the drying tower was disconnected from the air line. Heating of the flask was begun slowly to approximately 445° F. in about three hours. The heat was turned off and the catalyst was cooled and transferred to a moisture-tight container. The resulting catalyst contained 19.3 weight percent aluminum chloride based upon the platinum-alumina catalyst and its surface area was 238 square meters per gram.

(C)

A platinum-alumina composition prepared essentially as described above in Example I(A), except that air was used for the complete calcination procedure and containing about 0.6 percent platinum was employed in preparing the noble metal-aluminum halide-alumina catalyst by the following procedure. The platinum-activated alumina composition and aluminum chloride are charged into a Pyrex tube. The pressure in the tube is reduced to less than 200 microns (a micron=0.001 mm. Hg) pressure using a mechanical vacuum pump. The tube is sealed off under vacuum, is heated for 2 hours at 350° F. followed by heating for 3 hours at 400° F. The tube is rotated during the heating period at a rate of 12–20 r.p.m. The catalyst is removed and handled in a dry box.

EXAMPLE II 15 grams of platinum-aluminum chloride-alumina catalyst prepared essentially as described above in Example I(C) and containing 0.437% platinum and 17.53% chloride (as aluminum chloride) are placed in each of two 14-inch x 1-inch diameter heavy-wall Pyrex bombs. The neck of the bomb was attached to a mechanical vacuum pump and the pressure in the bomb reduced to less than 0.5 mm. Hg at a temperature of 75° F. The neck of the bomb was sealed off under vacuum and the bomb was fastened inside a stainless steel container. The container was placed in a radiant furnace and rotated at 12 r.p.m. The temperature inside the container was brought to 700° F. and held at 700±15° F. for 24 hours. The container was then cooled and when the temperature inside it reached 155° F. rotation was stopped. When the container was at room temperature the bomb was removed, placed in a dry box and the seal broken. The contents were discharged into a moisture-tight bottle. Recovery was 29 g. Analysis, 13.97% Cl.

EXAMPLE III

A catalyst was prepared essentially by the procedure of Example II and was tested for activity in isomerizing pure grade normal pentane containing 5 percent carbon tetrachloride, as a hydrogen chloride yielding agent, by weight in a $1''$ I.D. Universal reactor unit. The hydrogen line passed through a Deoxo unit, and both hydrogen and hydrocarbon sources were dried over 4 A. molecular sieve before entering the reactor.

The following table, Table I, gives the conditions and results of the test made in this manner.

Table I

| | |
|---|---|
| Run No. | 899–83 |
| Hrs. on stream | 7 |
| Conditions: | |
| Temp., ° F. | 250 |
| Press., p.s.i.g. | 300 |
| WHSV | 4.92 |
| Mole ratio $H_2$/H'C | 5.10 |
| Product distribution, wt. percent: | |
| $i-C_4$ | .47 |
| $n-C_4$ | .22 |
| $i-C_5$ | 70.15 |
| $n-C_5$ | 29.35 |
| $C_5-$ | .19 |
| $n-C_6$ | .08 |
| Conversion to $i-C_5$ percent | 70.26 |
| Selectivity, $i-C_5$ percent | 99.67 |
| Chloride: | |
| Virgin, percent | 13.97 |
| Final, percent | 13.81 |
| Virgin crush, lbs. | 3.3 |
| $N_2$ area, m.²/g. | 145 |

The thermal treatments, in addition to providing free platinum metal, are believed to beneficially promote a reaction between the $AlCl_3$ and the $Al_2O_3$ of the support. Increased interaction should lead to better chloride retention. This is borne out by data on chloride content before and after the activity check. Comparison may be made to chloride contents of similarly used platinum-aluminum chloride-alumina catalysts with different pretreatment.

| Catalyst No. | 480–168 | 480–9 | 480–400 |
|---|---|---|---|
| Pretreatment | 3 hrs. $H_2$ at 500° F. | 4 hrs. $H_2$ at 500° F. | 24 hrs. vacuum, at 700° F. |
| Hrs. on stream | 14 | 5 | 7. |
| Virgin, percent Cl | 17.8 | 13.04 | 13.97. |
| Used, percent Cl | 11.6 | 10.93 | 13.81. |
| Surface area (virgin) (m.²/g.) | 175 | 269 | 145. |

Evidence that interaction has taken place also comes from the surface area which is much less for catalysts pretreated at 700° F. in vacuum (compare 480–9, 269 m.²/g. and 480–400, 145 m.²/g.) than for a catalyst treated at 500° F. in $H_2$.

The activity of the catalyst is believed to be dependent on its chloride content. For a catalyst to have good activity the chloride level should be kept above, for instance, 8 to 10% for supports of 350 to 500 m.$^2$/g. Thus a catalyst in which AlCl$_3$ and HCl are more tightly bound to the surface is highly desirable since chloride loss could be reduced or eliminated.

It is claimed:

1. A process for activating a catalyst composite consisting essentially of a platinum group noble metal decomposable compound sufficient to provide about 0.01 to 2 percent of a platinum group noble metal, about 5 to 50 percent of an aluminum halide Friedel-Crafts component and about 40 to 95 percent of an activated alumina comprising placing the catalyst under a vacuum less than about 5 mm. Hg at temperatures up to about 150° F. and heating the catalyst composite under said vacuum at temperatures from about 600° F. to 900° F. for a time sufficient to enhance the hydrocarbon conversion activity of the catalyst.

2. The process of claim 1 wherein the activation temperatures are from about 650° F. to 750° F.

3. The process of claim 1 wherein the catalyst consists essentially of a platinum oxide sufficient to provide about 0.1 to 0.75 percent of platinum, about 10 to 30 percent of aluminum chloride, and an activated alumina derived by calcination of an alumina hydrate precursor consisting essentially of about 65 to 95% of alumina trihydrate and about 5 to 35 percent of a member selected from the group consisting of amorphous hydrous alumina, alumina monohydrate, and their mixture and the activated alumina has an area of about 350 to 550 square meters per gram.

4. A process for activating a catalyst composite consisting essentially of a platinum group noble metal decomposable compound sufficient to provide about 0.01 to 2 percent of a platinum group noble metal, about 5 to 50 percent of an aluminum halide Friedel-Crafts component and about 40 to 95 percent of an activated alumina comprising placing the catalyst under a vacuum less than about 5 mm. Hg at temperatures up to about 150° F. and heating the catalyst composite under said vacuum at temperatures from about 600° F. to 900° F. for about 0.25 to 48 hours to sufficiently enhance the hydrocarbon conversion activity of the catalyst.

5. The process of claim 4 wherein the activation temperatures are from about 650° F. to 750° F.

6. The process of claim 4 wherein the catalyst consists essentially of a platinum oxide sufficient to provide about 0.1 to 0.75 percent of platinum, about 10 to 30 percent of aluminum chloride, and an activated alumina derived by calcination of an alumina hydrate precursor consisting essentially of about 65 to 95% of alumina trihydrate and about 5 to 35 percent of a member selected from the group consisting of amorphous hydrous alumina, alumina monohydrate, and their mixture and the activated alumina has an area of about 350 to 550 square meters per gram.

References Cited in the file of this patent
UNITED STATES PATENTS

| | | |
|---|---|---|
| 2,226,548 | Burk | Dec. 31, 1940 |
| 2,838,444 | Teter et al. | June 10, 1958 |
| 2,900,425 | Bloch et al. | Aug. 18, 1959 |
| 2,924,629 | Donaldson | Feb. 9, 1960 |